US008293855B2

(12) United States Patent
Meier et al.

(10) Patent No.: US 8,293,855 B2
(45) Date of Patent: Oct. 23, 2012

(54) METHOD FOR TRANSITIONING BETWEEN INCOMPATIBLE OLEFIN POLYMERIZATION CATALYST SYSTEMS

(75) Inventors: Gerhardus Meier, Frankfurt am Main (DE); Shahram Mihan, Bad Soden (DE); Massimo Covezzi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 40 days.

(21) Appl. No.: 12/737,512

(22) PCT Filed: Jul. 21, 2009

(86) PCT No.: PCT/EP2009/005280
§ 371 (c)(1),
(2), (4) Date: Jan. 19, 2011

(87) PCT Pub. No.: WO2010/009860
PCT Pub. Date: Jan. 28, 2010

(65) Prior Publication Data
US 2011/0130527 A1    Jun. 2, 2011

Related U.S. Application Data

(60) Provisional application No. 61/195,117, filed on Oct. 3, 2008.

(30) Foreign Application Priority Data

Jul. 23, 2008 (EP) ..................................... 08013232

(51) Int. Cl.
*C08F 2/38* (2006.01)
*C08F 210/00* (2006.01)
*C08F 210/02* (2006.01)
*C08F 210/08* (2006.01)
*C08F 210/14* (2006.01)
*C08F 4/16* (2006.01)

(52) U.S. Cl. ............ 526/82; 526/90; 526/117; 526/160; 526/348

(58) Field of Classification Search .................... 526/82, 526/90, 117, 160, 348
See application file for complete search history.

(56) References Cited

U.S. PATENT DOCUMENTS

| 5,153,157 | A | 10/1992 | Hlatky |
| 5,565,534 | A | 10/1996 | Aulbach |
| 5,672,665 | A | 9/1997 | Acapiou et al. |
| 2004/0143076 | A1 | 7/2004 | Terry et al. |
| 2004/0186250 | A1* | 9/2004 | Kinnan et al. ........... 526/82 |

FOREIGN PATENT DOCUMENTS

| CA | 2084016 | 6/2004 |
| CA | 2138723 | 7/2005 |
| CA | 2099214 | 8/2005 |
| DE | 19756276 | 6/1999 |
| EP | 0089691 | 9/1983 |
| EP | 089691 | 9/1983 |
| EP | 129368 | 12/1984 |
| EP | 0416815 | 3/1991 |
| EP | 0475603 | 3/1992 |
| EP | 0545304 | 6/1993 |
| EP | 0561479 | 9/1993 |
| EP | 571826 | 12/1993 |
| EP | 0571826 | 12/1993 |
| EP | 0576970 | 1/1994 |
| EP | 0632063 | 1/1995 |
| EP | 0659758 | 6/1995 |
| EP | 0661300 | 7/1995 |
| EP | 1042399 | 10/2000 |
| EP | 1182216 | 2/2002 |
| GB | 2367298 | 4/2002 |
| WO | 9526370 | 10/1995 |
| WO | 9827124 | 6/1998 |
| WO | WO-98/27124 | 6/1998 |
| WO | 0058377 | 10/2000 |
| WO | WO-0058377 | 10/2000 |
| WO | WO-0177190 | 10/2001 |
| WO | 02102896 | 12/2002 |
| WO | 2005103100 | 11/2005 |

(Continued)

OTHER PUBLICATIONS

Small, Brooke L. et al., "Highly Active Iron and Cobalt Catalysts for the Polymerization of Ethylene", J.Am. Chem. Soc. 1998, 4049-4050.
Britovsek, George J. , "Novel olefin polymerization catalysts based on iron and cobalt", Chem. Commun. 1998, 849-850.
Strauss, Steven H. , "The Search for Larger and More Weakly Coordinating Anions", Chem. Rev. vol. 93(3) 1993, 927-942.
Weisenfeldt, Helga , "ansa-Metallocene derivatives; XVII. Racemic and meso diastereomers of group IV metallocene derivatives with symmetrically substituted dimethylsilanediyl-bridged ligand frameworks. Crystal structure of R,S-Me2SI(3-1-Bu-5-MeC5H2)2ZrC12", Journal of Organometallic Chemistry, 369 Elsevier Sequoia S.A., Lausanne—Printed in the Netherlands 1989, 359-370.
Benoit, H. Rempp et al., "A Universal Calibration for Gel Permeation Chromatography", Journal of Polymer Sci., Phys. Ed. 5 1967, 753-759.

(Continued)

Primary Examiner — William Cheung
(74) Attorney, Agent, or Firm — Dilworth IP LLC

(57) ABSTRACT

A method for transitioning from a first to a second catalyst system for the olefin polymerization reaction in one reactor, wherein the first catalyst system is incompatible with the second catalyst system, is described. The method comprises the steps of a) discontinuing a first olefin polymerization reaction performed in the presence of the first catalyst system; and b) performing a second olefin polymerization reaction in the presence of the second catalyst system comprising catalyst components (A) and (B) producing, respectively, a first and a second polyolefin fraction, wherein the $M_w$ of the first polyolefin fraction is less than the $M_w$ of the second polyolefin fraction and the initial activity of catalyst component (A) exceeds the initial activity of catalyst component (B). Thanks to this method, there is no need to empty the reactor after the first olefin polymerization reaction, and the transitioning time needed to attain the desired quality of the polyolefin obtained in the second olefin polymerization reaction is sufficiently short to permit a quick and reliable change of production.

13 Claims, No Drawings

FOREIGN PATENT DOCUMENTS

| | | |
|---|---|---|
| WO | WO-2005103100 | 11/2005 |
| WO | WO-2006069204 | 6/2006 |
| WO | 2007059867 | 5/2007 |
| WO | WO-2010009860 | 1/2010 |
| WO | WO-2010072367 | 7/2010 |

OTHER PUBLICATIONS

Fieser, Louis et al., "Textbook of Organic Chemistry, Third Revised Edition", Verlag Chemie-GmbH, Weinheim/Bergstr. 1957 1957, 10 pages.

* cited by examiner

METHOD FOR TRANSITIONING BETWEEN INCOMPATIBLE OLEFIN POLYMERIZATION CATALYST SYSTEMS

This application is the U.S. national phase of International Application PCT/EP2009/005280, filed Jul. 21, 2009, claiming priority to European Application 08013232.7 filed Jul. 23, 2008 and the benefit under 35 U.S.C. 119(e) of U.S. Provisional Application No. 61/195,117, filed Oct. 3, 2008; the disclosures of International Application PCT/EP2009/005280, European Application 08013232.7 and U.S. Provisional Application No. 61/195,117, each as filed, are incorporated herein by reference.

The present invention relates to a method for transitioning between incompatible polymerization catalyst systems, in particular catalyst systems for the polymerization of olefins, in one reactor.

More particularly, the present invention relates to a method as defined above in which the second catalyst system comprises catalyst components (A) and (B) producing, respectively, a first and a second polyolefin fraction.

In the present description and in the following claims the term "catalyst system" is used to indicate a system comprising at least one catalyst component, i.e. at least one metal component catalyzing the olefin polymerization reaction, and, optionally, further components, such as an agent activating the catalyst component (also known as cocatalyst or activator), a support and any other component as is well known in the art.

In the present description and in the following claims the term "mixed catalyst system" is used to indicate a catalyst system comprising at least two catalyst components.

Unless otherwise indicated, in the present description and in the following claims the term "polymerization" is used to indicate a homopolymerization or a copolymerization.

Unless otherwise indicated, in the present description and in the following claims the term "polymer" is used to indicate a homopolymer or a copolymer comprising a monomer and at least one comonomer.

The method is useful to carry out the above-mentioned transitioning in the preparation of polyolefins, particularly but not exclusively of polyethylene.

Unless otherwise indicated, in the present description and in the following claims the term "polyethylene" is used to indicate an ethylene homopolymer or a copolymer of ethylene and at least a further comonomer.

Unless otherwise indicated, in the present description and in the following claims the term "ethylene homopolymer" is used to indicate a polymer comprising repeating ethylene monomeric units, possible comonomers of different species being present in a limited amount, in any case such that the melting temperature $T_m$ of the polymer is about 125° C. or greater, wherein the melting temperature $T_m$ is the temperature at the maximum of the melting peak as better described in the following. $T_m$ is measured according to ISO 11357-3 by a first heating at a heating rate of 20° C./min until a temperature of 200° C. is reached, a dynamic crystallization at a cooling rate of 20° C./min until a temperature of −10° C. is reached, at a second heating at a heating rate of 20° C./min until a temperature of 200° C. is reached. The melting temperature $T_m$ (maximum of the melting peak of the second heating) is therefore the temperature at which the curve of the enthalpy vs. temperature of the second heating has a maximum.

Unless otherwise indicated, in the present description and in the following claims the term "copolymer of ethylene" is used to indicate a polymer comprising repeating ethylene monomeric units and at least one further comonomer of different species, having a melting temperature $T_m$ lower than 125° C.

The above-mentioned method is particularly but not exclusively useful to carry out the above-mentioned transitioning in gas phase, preferably in a fluidized bed reactor, and particularly but not exclusively in case of transitioning between a Ziegler-Natta catalyst system and a mixed catalyst system comprising a single site catalyst component and a non-single site catalyst component used in the polymerization of olefins, particularly of ethylene.

BACKGROUND OF THE INVENTION AND PRIOR ART

Gas-phase olefin polymerization processes are economical processes for the polymerization of olefins. Such gas-phase polymerization processes can, in particular, be carried out in gas-phase fluidized-bed reactors in which the polymer particles are kept suspended by means of an appropriate gas stream. Processes of this type are described, for example, in European patent applications EP-A-0 475 603, EP-A-0 089 691 and EP-A-0 571 826, whose contents are hereby fully incorporated by reference.

In the production of polyolefins, in order to produce different polymer grades in the same reactor, there is the need, from time to time, to change the catalyst system. Therefore with a certain frequency, depending on the flexibility required to the reactor and on the production plans, it is necessary to use a first catalyst system to produce a first polymer and, subsequently, to use a second catalyst system to produce a second polymer. This change may not involve any substantial issue when a first catalyst system and the second catalyst system are compatible with one another, i.e. when both catalyst systems can operate under substantially the same process conditions (generally temperature, pressure, amount of molar mass regulator, etc.) without substantially losing activity.

However, the change from a first catalyst system to a second catalyst system which is incompatible with the first catalyst system involves problems in ensuring an adequate continuity of production in terms of both quantity and quality of the product and has therefore been the subject of much effort.

In the present description and in the following claims, two catalyst systems are incompatible to each other if they respond in different ways to process conditions and/or monomers or any process agents employed in the process, such as to molecular weight regulators, for example hydrogen, comonomers or antistatic agents, and if, due this different responsiveness, the polymers obtained by transitioning from the first catalyst system to the second catalyst system have unacceptable properties (e.g. molecular weight and/or melt flow rate and/or melt flow ratio out of the respective target value, presence of gels and fines, insufficient environmental crack resistance) or the process productivity is unacceptably low (e.g. due to chunks or sheeting in the reactor).

This definition applies to any of the components making part of the catalyst systems and mentioned above. So, in the present description and in the following claims, two catalyst systems are incompatible to each other if at least one component of the first catalyst system is incompatible with at least one component of the second catalyst system.

For example, a single site catalyst such as a metallocene catalyst is not compatible with a Ziegler-Natta catalyst mainly because, in order to produce, for example, a polyethylene having a predetermined melt flow rate, Ziegler-Natta catalysts require operating at high hydrogen concentrations (by way of illustrative example, at a ratio of hydrogen to ethylene in the order of 1).

By way of illustrative example, single site catalysts comprise metallocene catalysts. Single-site catalysts may comprise for example compounds selected from the group of metallocenes (including cyclopentadienyl derivatives, optionally substituted with cyclic compounds), phenoxyimin derivatives, as well as neutral or charged bidentate or tridentate nitrogen ligands with 2 or 3 coordinating nitrogen atoms.

In the present description and in the following claims, the expression "metallocene catalyst" is used to indicate a catalyst component comprising at least one cyclopentadienyl transition metal complex and, generally, a compound having the following formula:

wherein Cp is a substituted or unsubstituted cyclopentadienyl ring or derivative thereof, M is a transition metal, preferably a Group 4, 5, or 6 metal, R is a hydrocarbyl group or hydrocarboxy group having from one to twenty carbon atoms, and X is a halogen. Generally, the metallocene catalyst components referenced herein include half and full sandwich compounds having one or more bulky ligands bonded to at least one metal atom. Typical metallocene catalyst components are generally described as containing one or more bulky ligand(s) and one or more leaving group(s) bonded to at least one metal atom. For the purposes of this description and appended claims, the term "leaving group" is any ligand that can be abstracted from a bulky ligand metallocene catalyst to form a metallocene catalyst cation capable of polymerizing one or more olefins.

The bulky ligands are generally represented by one or more open or fused ring(s) or ring system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 16 and the lanthanide or actinide series of the Periodic Table of Elements. Preferably the metal is a transition metal from Groups 4 through 12, more preferably 4, 5 and 6, and most preferably the metal is from Group 4.

Single site catalysts, however, such as for example metallocene catalysts, must be operated at low hydrogen concentrations (of some centimol %, for example in the order of 0.06 mol %).

So, if Ziegler-Natta catalysts are operated at low hydrogen, they produce very high molecular weight polymers, while if metallocene catalysts are operated at low hydrogen, they produce low molecular weight polymers. Accordingly, combining the Ziegler-Natta catalyst and the metallocene catalyst and operating at low hydrogen concentration will lead to a polymer containing ultra-high molecular weight chains which, following processing, give rise to gels.

In order to perform the above-mentioned change of catalyst system, the most common method of the state of the art is that of stopping the first polymerization reaction by means of a deactivating agent, emptying the reactor, cleaning it and starting it up again by introducing the second catalyst system. Thus, for example, WO 00/58377 discloses a discontinuous method for changing between two incompatible catalysts, in which the first polymerization reaction is stopped, the polymer is removed from the reactor, the reactor is rapidly purged with nitrogen, a new seedbed of polymer particulates is introduced into the reactor and the second polymerization reaction is then started. However, on the one side the opening of the reactor leads to deposits on the walls which have an adverse effect on the renewed start-up of the reactor and, on the other side, such method inevitably requires a discontinuation of the polymerization process and an unacceptably long stop time between the first polymerization reaction and the second polymerization reaction.

Application WO95/26370 describes a process for transitioning from a polymerization reaction catalyzed by a first catalyst system to a polymerization reaction catalyzed by a second catalyst system comprising a metallocene catalyst, wherein the first and second catalyst systems are incompatible. According to WO95/26370, the introduction of the first catalyst system into the reactor is discontinued, an irreversible catalyst killer and optionally a reversible catalyst killer is (are) introduced in the reactor, and then the second catalyst system is introduced into the reactor. Although among the catalyst systems described by WO95/26370, mixed catalyst systems comprising a metallocene catalyst are generally envisaged, there is no specific teaching on the transitioning from a first catalyst system to a second catalyst system of the mixed type.

WO2007/059867 describes a method of changing from a polymerization using a first catalyst to a polymerization using a second catalyst which is incompatible with the first catalyst in a gas-phase reactor, which comprises the steps of stopping of the polymerization reaction using the first catalyst, flushing of the reactor under polymerization conditions with at least one deactivating agent, introducing the second catalyst into the reactor, and continuing the polymerization using the second catalyst. The second catalyst may be a mixed catalyst. Although a generic reference to the possibility of retaining the particle bed is made, still the teaching of WO2007/059867 is that of emptying the reactor and filling it with a new particle bed.

Furthermore, even in view of the teaching of these prior art documents, there is still the need to reduce the transition time used to perform the above-mentioned transitioning.

SUMMARY OF THE INVENTION

The Applicant has perceived the need of performing an effective and rapid transition between incompatible catalyst systems in one reactor where different catalyst systems, either comprising only one catalyst component or comprising or at least two catalyst components (i.e. a mixed catalyst system comprising a plurality of different kind of active species) intended to produce respective polymer fractions having different properties, generally different molecular weights, are used to perform polymerization reactions, thus permitting, inter alia, also the production of both monomodal and multimodal polymers in the same reactor.

As is known, monomodal polymers, which are prepared by means of catalyst systems comprising only one catalyst component, have a monomodal molecular weight distribution curve, i.e. a curve having a single peak due to the presence of a single polymer fraction having a given molecular weight, while multimodal polymers, which are for example prepared by means of mixed catalyst systems comprising at least two different catalyst components giving rise to respectively different polymers having distinct molecular weight, generally have a molecular weight distribution curve having more than one molecular weight peak due to the presence of a plurality of polymer fractions having distinct molecular weights.

Among the various alternative methods known to produce multimodal polymers, including post reactor or melt blending, use of multistage reactors, as well as catalytic polymerization in a single reactor by using a mixed catalyst system able to produce such a multimodal polymer, the catalytic polymerization by means of a mixed catalyst system is preferred because it allows to prepare a polymer having a good mixing quality in a single reactor by means of a single catalyst system.

With reference for example to the preferred polymer of the present invention, namely polyethylene, in the present description and in the following claims the expression "multimodal polyethylene" is used to indicate a polyethylene having at least a bimodal molecular weight distribution curve, having at least two molecular weight peaks, or at least a point of inflection on one flank of a maximum, due to the presence of at least two polymer fractions having different molecular weights. The multimodal polyethylene may also show three or more molecular weight peaks (or at least two points of inflection on one flank of a maximum), due to the presence of at least three polymer fractions having different molecular weights.

One of the objects of the present invention is therefore that of providing a method enabling a reliable catalyst transition in a time as short as possible especially when at least the second of the two incompatible catalyst systems intended to be used in succession in the same reactor is of the mixed type, i.e. comprising a first catalyst component and a second catalyst component.

The Applicant has surprisingly found that, in order to obtain, with the second catalyst system, a multimodal polymer attaining predetermined target properties in the shortest time possible after switching from a first catalyst system incompatible therewith, it is convenient that the second polymerization reaction is performed so as to make, at the beginning of the second polymerization reaction, one of the two catalyst components more active than the other one. If one of the two catalyst components is more active for a predetermined initial time, in fact, the target properties of the polymer can be attained in a short time after discontinuing the first polymerization. In other words, it has been surprisingly found that by a differentiation of the relative activity of the two catalyst components of the second catalyst system for a predetermined initial time of the second polymerization reaction, an improved and more effective transitioning is achieved.

More particularly, the Applicant has surprisingly found that it may be convenient that the second polymerization reaction preferably starts with initial no activity or initial relatively lower activity of the catalyst component giving rise to the polymer fraction having the relatively higher molecular weight with respect to the activity of the catalyst component giving rise to the polymer fraction having the relatively lower molecular weight.

According to the wording of attached claims, and as described in more details in the following, this catalyst component which should be preferably inactive or in any case less active with respect to the other catalyst component at the beginning of the second polymerization reaction is the second catalyst component of the second catalyst system.

Furthermore, the Applicant has surprisingly found that it may be convenient that the second polymerization reaction preferably starts with initial no activation or initial relatively lower activation of the catalyst component giving rise to the polymer fraction having the relatively narrower molecular weight distribution with respect to the activity of the catalyst component giving rise to the polymer fraction having the relatively broader molecular weight distribution.

Accordingly, the present invention provides a method for transitioning from a first to a second catalyst system for the olefin polymerization in one reactor, the first catalyst system being incompatible with the second catalyst system, said method comprising the steps of:

a) discontinuing a first olefin polymerization reaction performed in the presence of the first catalyst system; and
 b) performing a second olefin polymerization reaction in the presence of the second catalyst system comprising catalyst components (A) and (B) producing, respectively, a first and a second polyolefin fraction, wherein the $M_w$ of the first polyolefin fraction is less than the $M_w$ of the second polyolefin fraction and the initial activity of catalyst component (A) exceeds the initial activity of catalyst component (B).

In the present description and following claims, $M_w$ is the "weight average molar mass" (weight average molecular weight), $M_n$ is the "number average molar mass" (number average molecular weight) and $M_w/M_n$ is the polydispersity: $M_w$ and $M_n$ are determined as defined in the detailed examples. If not otherwise indicated, the term "molecular weight" shall be understood as $M_w$.

In other words, the second polymerization reaction is initially performed so as to differentiate the relative activity between the first catalyst component (A) and the second catalyst component (B) of the second catalyst system, in particular so as to make the catalyst component giving rise to the polyolefin fraction having the relatively higher molecular weight (i.e. catalyst component (B)) relatively less active when compared to the activity of the catalyst component giving rise to the polyolefin fraction having the relatively lower molecular weight (i.e. catalyst component (A)) for a predetermined initial time.

In this way, a multimodal polymer in which the polymer fraction having the relatively lower molecular weight exceeds the polymer fraction having the relatively higher molecular weight (if any) is initially obtained as a result of the second polymerization reaction.

Advantageously, thanks to the combination of steps provided by the method of the invention, not only there is no need to empty the reactor, but the transitioning time needed to attain the desired quality of the multimodal polymer prepared with the second catalyst system is sufficiently short to permit a quick and reliable change of production from a first (either monomodal or multimodal) polymer, i.e. the polymer obtained in the first polymerization reaction, to a second multimodal polymer, i.e. the polymer obtained in the second polymerization reaction.

Furthermore, a reduction of fines is advantageously achieved, which is particularly desirable in film applications.

The above-mentioned steps a) and b) are preferably performed in a continuous manner, i.e. without any intermediate step therebetween, and in particular without any step of emptying reactor. Advantageously, with reference for example to a preferred embodiment in which a fluidized bed reactor is used, there is no need to empty the reactor and to fill the reactor again with fresh polymer powder in order to form a new bed.

Preferably, the second polymerization reaction is performed so as to make the catalyst component giving rise to the polymer fraction having the relatively narrower molecular weight distribution relatively less active when compared to the activity of the catalyst component giving rise to the polymer fraction having the relatively broader molecular weight distribution for a predetermined initial time.

The first polymer and the second polymer are polyolefins, preferably polyethylene or polypropylene. Preferably, each of the two polyolefins is polyethylene. Preferably, both the at least one first and the at least one second polymer fractions of the second polymer are ethylene polymer fractions.

Either the first or the second or both polymers prepared in the two olefin polymerization reactions are preferably polyethylene, preferably a copolymer of ethylene and at least one comonomer, preferably an alpha-olefin. Preferred alpha-olefins comprise olefins having from 3 to 12 carbon atoms, preferably from 3 to 10 carbon atoms, e.g. propene, 1-butene, 1-pentene, 1-hexene, 4-methyl-1-pentene, 1-heptene, 1-octene, 1-decene. Particularly preferred comonomers comprise 1-butene, 1-pentene, 1-hexene, 4-methyl-1-pentene, 1-octene, and, still more preferably, 1-butene, 1-hexene, 1-octene.

Even if the following considerations will refer to the homopolymerization of ethylene or to the copolymerization of ethylene with at least one comonomer as preferred embodiment, it is intended that they apply to any kind of polymerization of olefins as well.

The reactor is preferably a gas phase reactor, preferably a continuous gas phase reactor, in particular a gas-phase fluidized-bed reactor. However, the method of the invention may be applied also in other phase or reactors, such as for example in bulk, in suspension or in a supercritical medium in any of the conventional reactors used for the polymerization of olefins. In other words, solution processes, suspension processes, stirred gas-phase processes and gas-phase fluidized-bed processes are all possible.

Preferably, the first catalyst system comprises a catalyst component and an agent activating the catalyst component (cocatalyst).

Preferably, the first catalyst system comprises only one catalyst component, i.e. a catalyst component having only one active catalyst component, which is intended to prepare a monomodal polymer.

Preferably, the first catalyst system comprises a Ziegler-Natta catalyst system.

According to a preferred embodiment, the Ziegler-Natta catalyst system comprises at least one Ziegler-Natta catalyst component, for example one or two Ziegler-Natta catalyst components. Preferably, the Ziegler-Natta catalyst system comprises one Ziegler-Natta catalyst component.

As is known in the art, Ziegler-Natta catalyst components generally consist of a complex of a base metal alkyl or halide with a transition metal salt.

Preferably, the Ziegler-Natta catalyst system comprises a Ziegler-Natta catalyst component and, additionally, an agent activating the Ziegler-Natta catalyst component.

Preferably, the agent activating the Ziegler-Natta catalyst component comprises an organometallic compound, preferably an organometallic compound, preferably an organometallic compound of a metal of Group 1, 2 or 3. Preferably, the first activating agent is selected from the group comprising, preferably consisting of: organometallic alkyls, alkoxides, and halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum (TMAL), triethylaluminum (TEAL), tri-isobutylaluminum (TIBAL) and tri-n-hexylaluminum (TNHAL) and the like.

According to an alternative embodiment, the first catalyst system comprises a metallocene catalyst.

According to an alternative embodiment, the first catalyst system comprises a Phillips catalyst.

As is known, Phillips catalysts are generally chromium oxide based catalysts.

Preferably, the second catalyst system comprises a single site catalyst component and a non-single site catalyst component.

In the present description and in the following claims, the expression "single site catalyst component" is used to indicate a catalyst component comprising a coordination metal complex capable of polymerizing a monomer, particularly an olefin monomer, preferably ethylene, and optionally at least one comonomer, preferably an alpha-olefin, so as to obtain a polyolefin, respectively a polyethylene, having a narrow molecular weight distribution.

In the present description and in the following claims, a polyolefin, preferably polyethylene, has a narrow molecular weight distribution when the polyolefin, respectively polyethylene, has a polydispersity $M_w/M_n$ lower than or equal to 5, preferably in the range from 1.5 to 5, more preferably from 1.5 to 3, still more preferably from 2 to 3.

In the present description and in the following claims, the expression "non-single site catalyst component" is used to indicate a catalyst component giving rise to a polyolefin having a polydispersity higher than 5. By way of illustrative example, transition metal coordination compounds including at least one ligand of the non-metallocene type, Ziegler-Natta catalysts and Phillips catalysts may be considered as examples of non-single site catalysts.

Preferably, the second catalyst system comprises a late transition metal catalyst component including at least one ligand of the non-metallocene type and a single site catalyst component, preferably a metallocene catalyst component.

Preferably, the second catalyst system comprises, as first catalyst component, a late transition metal catalyst component for olefin polymers by coordination polymerization, more preferably based on groups 8-10 of the Periodic Table of Elements, still more preferably selected from the group comprising, preferably consisting of Fe, Ni, Pd, Co.

Preferably, the first catalyst component of the second catalyst preferably comprises an iron catalyst component, preferably having a tridentate ligand bearing at least two ortho, ortho-disubstituted aryl radicals.

Preferred iron catalyst components may be the iron catalyst components described in patent application WO 2005/103100.

Preferred iron catalyst components are transition metal complexes with at least one ligand of the following general formula (I):

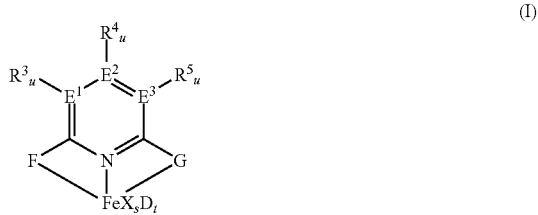

wherein the variables have the following meaning:

F and G, independently of one another, are selected from the group comprising, preferably consisting of:

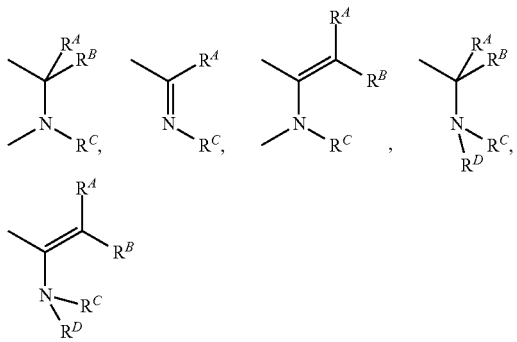

$R^3$-$R^5$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6 to 20 C atoms in the aryl radical, $NR^{12A}{}_2$, $OR^{12A}$, halogen, $SiR^{11A}{}_3$ or five-, six- or seven-membered heterocyclyl, which comprises at least one atom from the group consisting of N, P, O or S, wherein the organic radicals $R^{3A}$-$R^{15A}$ can also be substituted by halogens, $NR^{12A}{}_2$, $OR^{12A}$ or $SiR^{11A}{}_3$ and/or in each case two radicals $R^{3A}$-$R^{5A}$ and/or in each case two radicals $R^{6A}$-$R^{15A}$ can also be bonded with one another to form a five-, six- or seven-membered ring and/or in each case two radicals $R^{3A}$-$R^{5A}$ and/or in each case two radicals $R^{6A}$-$R^{10A}$ are bonded with one another to form a five-, six- or seven-membered heterocyclyl, which comprises at least one atom from the group consisting of N, P, O or S, $R^{11A}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6 to 20 C atoms in the aryl radical, and/or two radicals $R^{11A}$ can also be bonded with one another to form a five- or six-membered ring, $R^{12A}$ independently of one another denote hydrogen, $C_1$-$C_{22}$-alkyl, $C_2$-$C_{22}$-alkenyl, $C_6$-$C_{2\text{-}2}$-aryl, arylalkyl having 1 to 10 C atoms in the alkyl radical and 6 to 20 C atoms in the aryl radical, or $SiR^{11A}{}_3$, wherein the organic radicals $R^{12A}$ can also be substituted by halogens, and/or in each case two radicals $R^{12A}$ can also be bonded with one another to form a five- or six-membered ring, $R^A$,$R^B$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{11A}{}_3$, wherein the organic radicals $R^A$,$R^B$ can also be substituted by halogens, and/or in each case two radicals $R^A$,$R^B$ can also be bonded with one another to form a five- or six-membered ring, $R^C$,$R^D$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{11A}{}_3$, wherein the organic radicals $R^C$,$R^D$ can also be substituted by halogens, and/or in each case two radicals $R^C$,$R^D$ can also be bonded with one another to form a five- or six-membered ring, $E^1$-$E^3$ independently of one another denote carbon or nitrogen, u independently of one another are 0 for $E^1$-$E^3$ as nitrogen and 1 for $E^1$-$E^3$ as carbon, X independently of one another denote fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 C atoms in the alkyl radical and 6 to 20 C atoms in the aryl radical, $NR^{13A}{}_2$, $OR^{13A}$, $SR^{13A}$, $SO_3R^{13A}$, $OC(O)R^{13A}$, CN, SCN, β-diketonate, CO, $BF_4^-$, $PF_6^-$ or bulky non-coordinating anions, wherein the organic radicals $X^A$ can also be substituted by halogens and/or at least one radical $R^{13A}$, and the radicals X are optionally bonded with one another, $R^{13A}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6 to 20 C atoms in the aryl radical, or $SiR^{14A}{}_3$, wherein the organic radicals $R^{13A}$ can also be substituted by halogens, and/or in each case two radicals $R^{13A}$ can also be bonded with one another to form a five- or six-membered ring, $R^{14A}$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, wherein the organic radicals $R^{14A}$ can also be substituted by halogens, and/or in each case two radicals $R^{14A}$ can also be bonded with one another to form a five- or six-membered ring, s is 1, 2, 3 or 4, t is 0 to 4.

According to a preferred embodiment, the at least one iron catalyst is of formula (II):

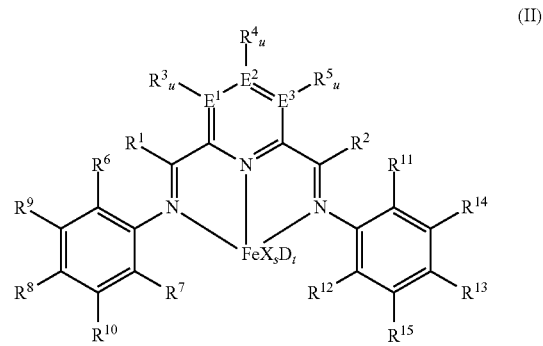

wherein the variables have the following meaning:

$R^1$-$R^2$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6-20 C atoms in the aryl radical, or five-, six- or seven-membered heterocyclyl, which comprises at least one atom from the group consisting of N, P, O or S, wherein the organic radicals $R^1$-$R^2$ can also be substituted by halogens, $NR^{16}{}_2$, $OR^{16}$ or $SiR^{17}{}_3$ and/or the two radicals $R^1$-$R^2$ can also be bonded with $R^3$-$R^5$ to form a five-, six- or seven-membered ring, $R^3$-$R^{15}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6-20 C atoms in the aryl radical, $NR^{16}{}_2$, $OR^{16}$, halogen, $SiR^{17}{}_3$ or five-, six- or seven-membered heterocyclyl, which comprises at least one atom from the group consisting of N, P, O or S, wherein the organic radicals $R^3$-$R^{15}$ can also be substituted by halogens, $NR^{16}{}_2$, $OR^{16}$ or $SiR^{17}{}_3$ and/or in each case two radicals $R^3$-$R^5$ can be bonded with one another and/or in each case two radicals $R^6$-$R^{10}$ can also be bonded with one another to form a five-, six- or seven-membered ring and/or in each case two radicals $R^{11}$-$R^{15}$ can also be bonded with one another to form a five-, six- or seven-membered ring, and/or in each case two radicals $R^3$-$R^5$ are bonded with one another and/or in each case two radicals $R^6$-$R^{10}$ are bonded with one another to form a five-, six- or seven-membered heterocyclyl and/or in each case two radicals $R^{11}$-$R^{15}$ are bonded with one another to form a five-, six- or seven-membered heterocyclyl, which comprises at least one atom from the group consisting of N, P, O or S, wherein at least one of the radicals $R^6$-$R^{15}$ is chlorine, bromine, iodine, $CF_3$ or $OR^{11}$.

wherein at least one radical R of the group consisting of $R^6$-$R^8$, and $R^{11}$-$R^{13}$ is chlorine, bromine, iodine, $CF_3$ or $OR^{11}$, $R^{16}$ independently of one another denote hydrogen, $C_1$-$C_{22}$-alkyl, $C_2$-$C_{22}$-alkenyl, $C_6$-$C_{22}$-aryl, arylalkyl having 1 to 10 C atoms in the alkyl radical and 6-20 C atoms in the aryl radical or $SiR^{17}_3$, wherein the organic radicals $R^{16}$ can also be substituted by halogens and in each case two radicals $R^{16}$ can also be bonded to form a five- or six-membered ring, $R^{17}$ independently of one another denote hydrogen, $C_1$-$C_{22}$-alkyl, $C_2$-$C_{22}$-alkenyl, $C_6$-$C_{22}$-aryl or arylalkyl having 1 to 10 C atoms in the alkyl radical and 6-20 C atoms in the aryl radical and in each case two radicals $R^{17}$ can also be bonded to form a five- or six-membered ring, $E^1$-$E^3$ independently of one another denote carbon, nitrogen or phosphorus, in particular carbon, and u independently of one another is 0 for $E^1$-$E^3$ as nitrogen or phosphorus and 1 for $E^1$-$E^3$ as carbon, X independently of one another denote fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 C atoms in the alkyl radical and 6-20 C atoms in the aryl radical, wherein the organic radicals X can also be substituted by $R^{18}$, $NR^{18}_2$, $OR^{18}$, $SR^{18}$, $SO_3R^{18}$, $OC(O)R^{18}$, CN, SCN, β-diketonate, CO, $BF_4^-$, $PF_6^-$ or bulky non-coordinating anions and the radicals X are if appropriate bonded with one another, $R^{18}$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6-20 C atoms in the aryl radical or $SiR^{19}_3$, wherein the organic radicals $R^{18}$ can also be substituted by halogens or nitrogen- and oxygen-containing groups and in each case two radicals $R^{18}$ can also be bonded to form a five- or six-membered ring, $R^{19}$ independently of one another denote hydrogen, $C_1$-$C_{20}$-alkyl, $C_2$-$C_{20}$-alkenyl, $C_6$-$C_{20}$-aryl or arylalkyl having 1 to 10 C atoms in the alkyl radical and 6-20 C atoms in the aryl radical, wherein the organic radicals $R^{19}$ can also be substituted by halogens or nitrogen- and oxygen-containing groups and in each case two radicals $R^{19}$ can also be bonded to form a five- or six-membered ring, s is 1, 2, 3 or 4, in particular 2 or 3, D is a neutral donor and t is 0 to 4, in particular 0, 1 or 2.

Preferably, at least one radical R of the group consisting of $R^6$-$R^8$ and $R^{11}$-$R^{13}$ is chlorine, bromine, iodine, $CF^3$ or $OR^{11}$.

The three atoms $E^1$-$E^3$ in a molecule can be identical or different. If $E^1$ is phosphorus, then $E^2$ to $E^3$ are preferably each carbon. If $E^1$ is nitrogen, then $E^2$ and $E^3$ are each preferably nitrogen or carbon, in particular carbon.

u independently of one another is 0 for $E^1$-$E^3$ as nitrogen or phosphorus and 1 for $E^1$-$E^3$ as carbon.

$R^1$-$R^2$ can be varied within a wide range. Possible carboorganic substituents $R^1$-$R^2$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^1$-$R^2$ may also be joined to form a 5-, 6- or 7-membered ring and/or two of the vicinal radicals $R^1$-$R^2$ may be joined to form a five-, six- or seven-membered heterocycle containing at least one atom from the group consisting of N, P, O and S and/or the organic radicals $R^1$-$R^2$ may also be substituted by halogens such as fluorine, chlorine or bromine. Furthermore, $R^3$-$R^{15}$ can also be amino $NR^{16}_2$ or $SiR^{17}_3$, alkoxy or aryloxy $OR^{16}$, for example dimethylamino, N-pyrrolidinyl, picolinyl, methoxy, ethoxy or isopropoxy or halogen such as fluorine, chlorine or bromine. Further possible radicals $R^{16}$ and $R^{17}$ are more fully described below. Two $R^{16}$ and/or $R^{17}$ may also be joined to form a 5- or 6-membered ring. The $SiR^{17}_3$ radicals may also be bound to $E^1$-$E^3$ via an oxygen or nitrogen. Examples for $R^{17}$ are trimethylsilyloxy, triethylsilyloxy, butyldimethylsilyloxy, tributylsilyloxy or tri-tert-butylsilyloxy.

The substituents $R^3$-$R^{15}$ can be varied within a wide range, as long as at least one radical R of $R^6$-$R^{15}$ is chlorine, bromine, and iodine, $CF_3$ or $OR^{11}$. Possible carboorganic substituents $R^3$-$R^{15}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^3$-$R^5$ and/or two vicinal radicals $R^6$-$R^{15}$ may also be joined to form a 5-, 6- or 7-membered ring and/or two of the vicinal radicals $R^3$-$R^5$ and/or two of the vicinal radicals $R^6$-$R^{15}$ may be joined to form a five-, six- or seven-membered heterocycle containing at least one atom from the group consisting of N, P, O and S and/or the organic radicals $R^3$-$R^5$ and/or $R^6$-$R^{15}$ may also be substituted by halogens such as fluorine, chlorine or bromine. Furthermore, $R^3$-$R^{15}$ can also be amino $NR^{16}_2$ or $SiR^{17}_3$, alkoxy or aryloxy $OR^{16}$, for example dimethylamino, N-pyrrolidinyl, picolinyl, methoxy, ethoxy or isopropoxy or halogen such as fluorine, chlorine or bromine. Further possible radicals $R^{16}$ and $R^{17}$ are more fully described below. Two $R^{16}$ and/or $R^{17}$ may also be joined to form a 5- or 6-membered ring. The $SiR^{17}_3$ radicals may also be bound to $E^1$-$E^3$ via an oxygen or nitrogen. Examples for $R^{17}$ are trimethylsilyloxy, triethylsilyloxy, butyldimethylsilyloxy, tributylsilyloxy or tri-tert-butylsilyloxy.

Preferred radicals $R^3$-$R^5$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred radicals $R^6$-$R^{15}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, wherein at least one of the radicals $R^6$-$R^{15}$ is chlorine, bromine, iodine, $CF_3$ or $OR^{11}$.

Preferably, at least one radical R of the group consisting of $R^6$-$R^8$, and $R^{11}$-$R^{13}$ is chlorine, bromine, or $CF_3$ and at least one radical R of the group consisting of $R^6$-$R^8$, and $R^{11}$-$R^{13}$ is hydrogen, or $C_1$-$C_4$-alkyl, wherein the alkyl can be linear or branched, in particular, methyl, ethyl, n-propyl, iso-propyl, n-butyl, iso-butyl, or tert.-butyl.

In particular, at least one radical R of the group consisting of $R^6$-$R^8$, and $R^{11}$-$R^{13}$ is chlorine or bromine and at least one radical R of the group consisting of $R^6$-$R^8$, and $R^{11}$-$R^{13}$ is hydrogen, or methyl.

Preferably, $R^6$ and/or $R^{11}$ are chlorine or bromine and $R^7$, $R^8$, $R^{12}$ and/or $R^{13}$ are hydrogen, or methyl. In another preferred embodiment of the invention, $R^6$ and $R^8$, and/or $R^{11}$ and $R^{13}$ are chlorine or bromine, and $R^7$ and/or $R^{12}$, are hydrogen or methyl. In a further preferred embodiment $R^6$ and $R^{11}$ are identical, and/or $R^7$ and $R^{12}$ are identical, and/or $R^8$ and $R^{13}$ are identical, wherein at least one pair of identical rests R is chlorine or bromine. In another preferred embodiment $R^6$ and $R^{11}$ are different, and/or $R^7$ and $R^{12}$ are different, and/or $R^8$ and $R^{13}$ are different, wherein at least rest R is chlorine or bromine. Particular preference is given to iron components in which at least one rest R $R^6$-$R^8$, and/or $R^{11}$-$R^{13}$ is chlorine.

In particular, at least one radical R of the group consisting of $R^9$, $R^{10}$, $R^{14}$, and $R^{15}$ is hydrogen, or $C_1$-$C_{22}$-alkyl which may also be substituted by halogens, e.g. methyl, trifluoromethyl, ethyl, n-propyl, n-butyl, n-pentyl, n-hexyl, n-heptyl, n-octyl, or vinyl. Particular preference is given to $R^9$, $R^{10}$, $R^{14}$, and $R^{15}$ being hydrogen, or methyl, ethyl, n-propyl, n-butyl, preferably hydrogen. Especially, $R^9$, $R^{10}$, $R^{14}$, and $R^{15}$ are identical.

Variation of the radicals $R^{16}$ enables, for example, physical properties such as solubility to be finely adjusted. Possible carboorganic substituents $R^{16}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{16}$ may also be joined to form a 5- or 6-membered ring and the organic radicals $R^{16}$ may also be substituted by halogens such as fluorine, chlorine or bromine.

Possible radicals $R^{17}$ in organosilicon substituents $SiR^{17}_3$ are the same radicals which have been described above for $R^1$-$R^2$, where two radicals $R^{17}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{17}$.

The ligands X result, for example, from the choice of the appropriate starting metal compounds used for the synthesis of the iron catalyst component, but can also be varied afterward. Possible ligands X are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands X, wherein the organic radicals X can also be substituted by $R^{18}$. As further ligands X, mention may be made, purely by way of example and in no way exhaustively, of trifluoroacetate, $BF_4^-$, $PF_6^-$ and weakly coordinating or non-coordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands X. Some of these substituted ligands X are particularly preferably used since they are obtainable from cheap and readily available starting materials. Thus, a particularly preferred embodiment is that in which X is dimethylamide, methoxide, ethoxide, isopropoxide, phenoxide, naphthoxide, triflate, p-toluenesulfonate, acetate or acetylacetonate.

The number s of the ligands X depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron centre or else still be present as residual solvent from the preparation of the iron catalyst components.

The number t of the ligands D can be from 0 to 4 and is often dependent on the solvent in which the iron complex is prepared and the time for which the resulting complexes are dried and can therefore also be a non-integer number such as 0.5 or 1.5. In particular, t is 0, 1 to 2.

Preferred iron catalyst components of formula (II) are 2,6-bis[1-(2-chloro-4,6-dimethylphenylimino)ethyl]pyridine iron(II) chloride; 2,6-bis[1-(2-chloro-6-methyl-phenylimino)ethyl]pyridine iron(II) dichloride, 2,6-bis[1-(2,6-dichlorophenylimino)ethyl]pyridine iron(II) dichloride, 2,6-bis[1-(2,4-dichloro-6-methyl-phenylimino)ethyl]pyridine iron(II) dichloride, 2,6-bis[1-(2,6-difluorophenylimino) ethyl]-pyridine iron(II) dichloride, 2,6-bis[1-(2,6-dibromophenylimino)ethyl]-pyridine iron(II) dichloride or the respective dibromides or tribromides.

The preparation of the iron complexes is described, for example, in J. Am. Chem. Soc. 120, p. 4049 ff. (1998), J. Chem. Soc., Chem. Commun. 1998, 849, and WO 98/27124.

Preferably, the second catalyst system comprises, as second catalyst component, early transition metal catalyst for olefin polymers by coordination polymerization, more preferably catalysts based on groups 4-6 of the Periodic Table of Elements, still more preferably selected from the group consisting of Ti, V, Cr, Zr, Hf.

Preferably, the second catalyst component of the second catalyst system comprises a monocyclopentadienyl complex of a metal of groups 4-6 of the Periodic Table of Elements, whose cyclopentadienyl system is preferably substituted by an uncharged donor or a hafnocene.

For the purposes of the present invention, an uncharged donor is an uncharged functional group containing an element of group 15 or 16 of the Periodic Table. Examples of cyclopentadienyl complexes are described in patent application WO2005/103100.

Preferred single site catalyst components suitable as second catalyst components of the second catalyst system may be polymerization catalysts based on a monocyclopentadienyl complex of a metal of groups 4-6 of the Periodic Table of Elements, preferably hafnocene catalyst components such as, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Particularly preferred hafnocenes are hafnium complexes of the following general formula:

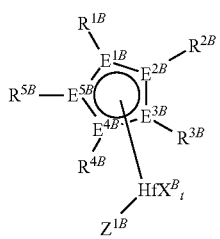

(III)

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (I) is uncharged, where $R^{6B}$ and $R^{7B}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8B}_2$, $N(SiR^{8B}_3)_2$, $OR^{8B}$, $OSiR^{8B}_3$, $SiR^{8B}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^{1B}$ is $X^B$ or

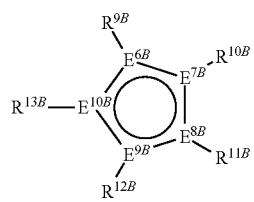

(IV)

where the radicals $R^{9B}$ to $R^{13B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}_2$, $N(SiR^{14B}_3)_2$, $OR^{14B}$, $OSiR^{14B}_3$, $SiR^{14B}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{6B}$-$E^{10B}$ are each carbon or not more than one $E^{6B}$ to $E^{10B}$ is phosphorus or nitrogen, preferably carbon, or where the radicals $R^{4B}$ and $Z^{1B}$ together form an —$R^{15B}_v$-$A^{1B}$- group, where $R^{15B}$ is

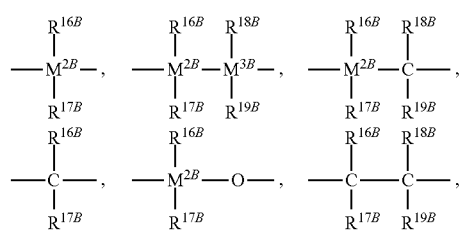

-continued

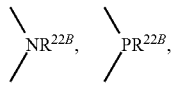

=BR$^{16B}$, =BNR$^{16B}$R$^{17B}$, =AlR$^{16B}$, —Ge—, —Sn—, —O—, —S—, =SO, =SO$_2$, =NR$^{16B}$, =CO, =PR$^{16B}$ or =P(O)R$^{16B}$, where R$^{16B}$-R$^{21B}$ are identical or different and are each a hydrogen atom, a halogen atom, a trimethylsilyl group, a C$_1$-C$_{10}$-alkyl group, a C$_1$-C$_{10}$-fluoroalkyl group, a C$_6$-C$_{10}$-fluoroaryl group, a C$_6$-C$_{10}$-aryl group, a C$_1$-C$_{10}$-alkoxy group, a C$_7$-C$_{15}$-alkylaryloxy group, a C$_2$-C$_{10}$-alkenyl group, a C$_7$-C$_{40}$-arylalkyl group, a C$_8$-C$_{40}$-arylalkenyl group or a C$_7$-C$_{40}$-alkylaryl group or two adjacent radicals together with the atoms connecting them form a saturated or unsaturated ring having from 4 to 15 carbon atoms, and M$^{2B}$-M$^{4B}$ are each silicon, germanium or tin, or preferably silicon, A$^{1B}$ is —O—, —O—,

\NR$^{22B}$, \PR$^{22B}$,
/        /

=O, =S, =NR$^{22B}$, —O—R$^{22B}$, —NR$^{22B}$$_2$, —PR$^{22B}$$_2$ or an unsubstituted, substituted or fused, heterocyclic ring system, where the radicals R$^{22B}$ are each, independently of one another, C$_1$-C$_{10}$-alkyl, C$_6$-C$_{15}$-aryl, C$_3$-C$_{10}$-cycloalkyl, C$_7$-C$_{18}$-alkylaryl or Si(R$^{23B}$)$_3$, R$^{23B}$ is hydrogen, C$_1$-C$_{10}$-alkyl, C$_6$-C$_{15}$-aryl which may in turn bear C$_1$-C$_4$-alkyl groups as substituents or C$_3$-C$_{10}$-cycloalkyl, v is 1 or when A$^{1B}$ is an unsubstituted, substituted or fused, heterocyclic ring system may also be 0 or where the radicals R$^{4B}$ and R$^{12B}$ together form an —R$^{15B}$— group.

A$^{1B}$ can, for example together with the bridge R$^{15B}$, form an amine, ether, thioether or phosphine. However, A$^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxa-diazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by C$_1$-C$_{10}$-alkyl, C$_6$-C$_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals X$^B$ in the general formula (III) are preferably identical, preferably fluorine, chlorine, bromine, C$_1$-C$_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded.

Examples of suitable hafnocenes are, inter alia, methylenebis(cyclopentadienyl)hafnium dichloride, methylenebis(3-methylcyclopentadienyl)hafnium dichloride, methylenebis(3-n-butylcyclopentadienyl)hafnium dichloride, methylene-bis(indenyl)hafnium dichloride, methylenebis(tetrahydroindenyl)hafnium dichloride, isopropylidene-bis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl)hafnium dichloride, isopropylidenebis(3-phenylcyclopentadienyl)hafnium dichloride, isopropylidenebis(indenyl)hafnium dichloride, isopropylidenbis(tetrahydroindenyl)hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl)hafnium dichloride, tetramethylethylene-9-fluorenylcyclopentadienylhafnium dichloride, dimethylsilanediylbis(tetramethylcyclopentadienyl)hafnium dichloride, dimethylsilanediylbis(3-trimethylsilylcyclopentadienyl)hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl) hafnium dichloride, methylphenylsilanediylbis(2-methyl-4, 5-benzindenyl)hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl) hafnium dichloride, diphenylsilanediylbis(2-methylindenyl) hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl) hafnium dichloride, dimethylsilanediylbis(2-ethyl-4-(1-naphthyl)indenyl)hafnium dichloride, dimethylsilanediylbis (2-propyl-4-(1-naphthyl)indenyl)hafnium dichloride, dimethylsilanediylbis(2-i-butyl-4-(1-naphthyl)indenyl) hafnium dichloride, dimethylsilanediylbis(2-propyl-4-(9-phenanthryl)indenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4[p-trifluoromethylphenyl]indenyl) hafnium dichloride, dimethylsilanediylbis(2-methyl-4-[3',5'-dimethylphenyl]indenyl)hafnium dichloride, dimethylsilanediylbis(2-methyl-4-[4'-tert-butyl-phenyl]indenyl)hafnium dichloride, diethylsilanediylbis(2-methyl-4-[4'-tert-butylphenyl]indenyl)hafnium dichloride, dimethylsilanediylbis(2-ethyl-4-[4'-tert-butylphenyl]indenyl)hafnium dichloride, dimethylsilanediylbis(2-propyl-4-[4'-tert-butyl-phenyl]indenyl)hafnium dichloride, dimethylsilanediylbis (2-isopropyl-4-[4'-tert-butylphenyl]indenyl)hafnium dichloride, dimethylsilanediylbis(2-n-butyl-4-[4'-tert-butylphenyl] indenyl)hafnium dichloride, dimethylsilanediylbis(2-hexyl-4-[4'-tert-butylphenyl]indenyl)hafnium dichloride, dimethylsilanediyl(2-isopropyl-4-phenylindenyl)(2-methyl-4-phenylindenyl)hafnium dichloride, dimethylsilanediyl(2-isopropyl-4-(1-naphthyl)indenyl)(2-methyl-4-(1-naphthyl) indenyl)hafnium dichloride, dimethylsilanediyl(2-isopropyl-4-[4'-tert-butylphenyl]indenyl)(2-methyl-4-[4'-tert-butylphenyl]indenyl)hafnium dichloride, dimethylsilanediyl (2-isopropyl-4-[4'-tert-butylphenyl]indenyl)(2-ethyl-4-[4'-tert-butylphenyl]indenyl)hafnium dichloride, dimethylsilanediyl(2-isopropyl-4-[4'-tert-butylphenyl]-indenyl)(2-methyl-4-[3',5'-bis-tert-butylphenyl]indenyl) hafnium dichloride, dimethylsilanediyl(2-isopropyl-4-[4'-tert-butylphenyl]indenyl)(2-methyl-4-[1'-naphthyl]indenyl) hafnium dichloride and ethylene(2-isopropyl-4-[4'-tert-butylphenyl]indenyl)(2-methyl-4-[4'-tert-butylphenyl] indenyl)-hafnium dichloride, and also the corresponding dimethylhafnium, monochloromono(alkylaryloxy)-hafnium and di(alkylaryloxy)hafnium compounds. The complexes can be used in the rac form, the meso form or as mixtures of these.

Among the hafnocenes of the above-mentioned general formula, those of the following formula

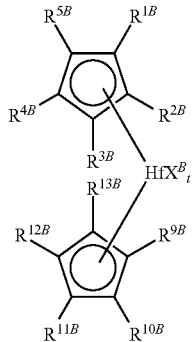

(V)

are preferred.

Among the compounds of formula (V), preference is given to those in which
$X^B$ is fluorine, chlorine, bromine, $C_1$-$C_4$-alkyl or benzyl, or two radicals $X^B$ form a substituted or unsubstituted butadiene ligand,
t is 1 or 2, preferably 2,
$R^{1B}$ to $R^{5B}$ are each hydrogen, $C_1$-$C_8$-alkyl, $C_6$-$C_8$-aryl, $NR^{8B}_2$, $OSiR^{8B}_3$ or $Si(R^{8B})_3$ and
$R^{9B}$ to $R^{13B}$ are each hydrogen, $C_1$-$C_8$-alkyl or $C_6$-$C_8$-aryl, $NR^{14B}_2$, $OSiR^{14B}_3$ or $Si(R^{14B})_3$
or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

The hafnocenes of the formula (V) in which the cyclopentadienyl radicals are identical are particularly useful.

Examples of particularly suitable compounds of the formula (V) are, inter alia:
bis(cyclopentadienyl)hafnium dichloride, bis(indenyl) hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethyl-cyclopentadienyl)hafnium dichloride, bis(1-n-butyl-3-methylcyclopentadienyl) hafnium dichloride, (cyclopentadienyl)(methylcyclopentadienyl)hafnium dichloride, (cyclopentadienyl)(n-butylcyclopentadienyl)hafnium dichloride, (methylcyclopentadienyl)(n-butylcyclopentadienyl) hafnium dichloride, (cyclopentadienyl)(1-methyl-3-n-butylcyclopentadienyl)hafnium dichloride, bis(tetramethylcyclopentadienyl)hafnium dichloride and also the corresponding dimethylhafnium compounds.

Further examples are the corresponding hafnocene compounds in which one or two of the chloride ligands have been replaced by bromide or iodide.

Further suitable metallocenes may be those based on the formulae (III) or (V), where, instead of hafnium, a different transition metal selected form the group consisting of early transition metal compounds is provided, such as for examples Ti, Zr, V, Cr.

By way of illustrative example, the second catalyst system comprises a mixed catalyst system preferably comprising at least one metallocene as single site catalyst component (B) (e.g. hafnocene or zirconocene) and at least one transition metal compounds of the non-metallocene type as non single site catalyst component (A), preferably a late transition metal, more preferably an iron catalyst component, preferably having a tridentate ligand bearing at least two aryl radicals, each bearing a halogen and/or alkyl substituent.

According to the method of invention, as mentioned above, the first olefin polymerization reaction, which is performed in the presence of the first catalyst system, is discontinued (step a)).

This discontinuing step a) is preferably performed by carrying out the steps of:
- a1) interrupting a feeding of the first catalyst system into the reactor; and
- a2) deactivating the first catalyst system, preferably in an irreversible manner.

Preferably, the step a2) of deactivating the first catalyst system is performed by feeding into the reactor an agent deactivating the first catalyst system, preferably an irreversible deactivating agent.

For the purposes of the present invention, any deactivating agent comprising substances or mixtures of substances which are able to react with at least one of the components of the first catalyst system so as to make the first catalyst system inactive, preferably irreversibly inactive, can be used.

Preference is given to deactivating agents irreversibly deactivating the first catalyst system, i.e. agents irreversibly inactivating the catalyst ability to polymerize the monomer(s), i.e. such that no reactivation of the first catalyst system can be observed even when the deactivating agent is removed or an activating agent (cocatalyst) is fed.

Preferably, the deactivating agent is selected from the group comprising, preferably consisting of: CO, $CO_2$, oxygen, water, alcohols, glycols, phenols, ethers, carbonyl compounds such as ketones, aldehydes, carboxylic acids, esters, fatty acids, alkynes such as acetylene, amines, alkoxyamines (such as for example commercially available Atmer) nitriles, nitrous compounds, pyridine, pyroles, carbonylsulfide, mercaptans, antistatic agents (such as for example Costelan AS100, available from Costenoble, Germany).

Preferably, the agent deactivating the first catalyst system is selected from the group comprising, preferably consisting of: oxygen, water, alcohols, glycols, phenols, carbon monoxide, carbon dioxide, ethers, carbonyl compounds, alkynes, nitrous compounds.

When a Ziegler-Natta catalyst system is used as first catalyst system, the first olefin polymerization reaction is preferably discontinued by feeding an alcohol, as described in more details in the following, or CO, $CO_2$, lean air, i.e. air which has a reduced proportion of oxygen.

When a Phillips catalyst system is used as first catalyst system, the first olefin polymerization reaction is preferably stopped by feeding CO, $CO_2$, oxygen or lean air.

When a metallocene catalyst system is used as first catalyst system, the first olefin polymerization reaction is preferably stopped by feeding CO, $CO_2$, or lean air.

Preferably, in the preferred embodiment according to which the reactor is gas phase reactor, in particular a gas-phase fluidized-bed reactor, the agent deactivating the first catalyst system is volatile under polymerization conditions.

For the purposes of the present invention, a volatile deactivating agent is a substance or a mixture of substances having a vapor pressure of above 1000 Pa under the conditions in the recycle gas system of the gas phase reactor. The vapor pressure is preferably sufficiently high to ensure complete deactivation of the catalyst present in the recycle gas system. Preference is given to a vapor pressure of above 1500 Pa, preferably above 2000 Pa, at 20° C. Preference is also given to a volatile deactivating agent having a boiling point below the temperature in the gas-phase fluidized-bed reactor under polymerization conditions, so that it vaporizes completely in the reactor.

Particularly suitable volatile deactivating agents are for example low molecular weight alcohols and their ethers, low molecular weight esters and amines having a sufficient vapor pressure for them to be able to be present in gaseous form in a sufficient amount under the usual polymerization conditions and preferably also under the conditions in the recycle gas system. Preference is given to the $C_1$-$C_4$-alcohols methanol (b.p.: 65° C., 128 hPa), ethanol (78° C., 60 hPa), 1-propanol (97.4° C., 18.7 hPa), 2-propanol (82° C., 43 hPa), 1-butanol (117° C., 6.7 hPa), 2-butanol (99° C., 17 hPa), tert-butanol (82.2° C., 41.3 hPa), with the values given in brackets being the boiling point and the vapor pressure, respectively, at 20° C. Preference is also given to the $C_2$-$C_6$-ethers. Particular preference is given to 2-propanol.

In addition to the deactivating agent, the use of further auxiliaries such as antistatics, scavengers, etc., is possible. To improve the facility to meter the deactivating agent, the latter can comprise inert solvents, for example saturated hydrocarbons such as hexane.

The amount of deactivating agent used is dependent on the size and geometry of the reactor. It is possible, for example, to start with a small amount and increase it until complete deactivation has taken place.

Furthermore, preference is given to a deactivating agent having an antistatic action.

According to a preferred embodiment thereof, the deactivating agent is metered in excess.

Alternatively, the first olefin polymerization reaction may be discontinued by interrupting the feeding of the first catalyst system into the reactor and by reducing or increasing the temperature, the pressure or the monomer concentration in the reactor, depending on the nature of the first catalyst system. A combination of any one of the above-mentioned ways of discontinuing the reaction is also possible.

According to an alternative embodiment, particularly suitable when the first catalyst system comprises a Ziegler-Natta catalyst system and the second catalyst system comprises a single site catalyst component, preferably a metallocene catalyst component, and a non-single site catalyst component, the step a) of discontinuing the first olefin polymerization reaction in a reactor is performed by carrying out the steps of:
- a1) interrupting the feeding of the first catalyst system into the reactor; and
- a2) increasing the reactor temperature.

Preferably, the reactor temperature is increased of about 10-20° C. with respect to the temperature at which the first olefin polymerization reaction is carried out. By way of an illustrative example, if the first olefin polymerization reaction is carried out at about 70° C.-90° C., then, after interrupting the feeding of the first catalyst system into the reactor, the reactor temperature is preferably set to about 80° C.-110° C., more preferably to about 90° C.-110° C., and in any case to a temperature higher than that of the first olefin polymerization reactor so as to deactivate the first catalyst system.

In order to deactivate the first catalyst system, the use of a deactivating agent and a temperature increase or reduction, depending on the nature of the two catalyst systems, can be also combined, so as to advantageously reduce, on the one side, the amount of deactivating agent and, on the other side, the temperature increase or decrease.

The step a) of discontinuing the first olefin polymerization reaction and the step b) of performing the second polymerization reaction as defined above are preferably performed in a continuous manner, i.e. without any intermediate step therebetween, in particular without any step of emptying reactor or, with reference for example to the preferred embodiment envisaging a fluidized bed reactor, of reducing the height of the bed. In other words, when the reactor is a fluidized-bed reactor, step b) can be performed after step a) while retaining the particle bed present in the reactor.

According to an alternative embodiment, after step a) and before step b) the particle bed mass is preferably lowered. In this way, the amount of deactivating agent needed to deactivate the first catalyst system may be advantageously reduced.

When an agent deactivating the first catalyst system is used, the method preferably further comprises the step of neutralizing the excess of deactivating agent.

Preferably, the step of neutralizing the excess of deactivating agent is carried out by using a scavenger.

Preferably, the step of neutralizing the excess of deactivating agent is carried out by feeding a neutralizing agent into the reactor, preferably an organometallic compound, more preferably an organometallic compound of a metal of Group 1, 2 or 3, more preferably an organometallic alkyl, more preferably an organoaluminum compound.

Preferably, the organometallic compound is selected from the group comprising, preferably consisting of: lithium alkyls, magnesium or zinc alkyls, magnesium alkyl halides, aluminum alkyls, silicon alkyls, silicon alkoxides and silicon alkyl halides. More preferably, the organometallic compounds are aluminum alkyls and magnesium alkyls. Still more preferably, the organometallic compounds are aluminum alkyls, preferably trialkylaluminum compounds. Preferably, the aluminum alkyls are, for example, trimethylaluminum (TMAL), triethylaluminum (TEAL), tri-isobutylaluminum (TIBAL) and tri-n-hexylaluminum (TNHAL) and the like.

Preferably, the step of neutralizing the excess of deactivating agent is carried out by the same compound used as an agent activating the first catalyst component, which is preferably an organometallic compound, preferably an organoaluminum compound.

The second olefin polymerization reaction is performed with an initial activity of catalyst component (A) exceeding the initial activity of catalyst component (B), i.e. for a predetermined time.

This predetermined time preferably depends on the difference in the molecular weights attainable by the catalyst components of the second catalyst system. The predetermined time is preferably the time at which a predetermined average molecular weight, preferably of about 80000, is achieved. Once the predetermined molecular weight is achieved, the relative activity of the two catalyst components (A) and (B) can be freely adjusted depending on the type of the target polyolefin. In other words, once a predetermined average molecular weight is achieved, the second olefin polymerization reaction can be continued and the relative activity between the two catalyst components (A) and (B) of the second catalyst system may be adjusted in a different manner when compared to the initial conditions, preferably so as to ensure the maximum activity of both catalyst components or any desired ratio between their activities which ensures a desired targeted product.

The relative activity between the two catalyst components of the second catalyst system may be adjusted by changing the conditions affecting the activity of at least one of the catalyst components of the second catalyst system, such as for example physical conditions (e.g. temperature, pressure) or chemical conditions.

According to a preferred embodiment, the second olefin polymerization reaction is initially performed in the presence of an agent reversibly deactivating catalyst component (B) of the second catalyst system.

Preferably, the agent reversibly deactivating catalyst component (B) of the second catalyst system derives from the reaction between the agent deactivating the first catalyst system and the neutralizing agent.

According to an alternative embodiment, the second olefin polymerization reaction is initially performed in the presence of an agent activating catalyst component (A) of the second catalyst system.

There are a number of ways to carry out step b) which are within the skills of the man skilled in the art. In principle, any way leading to an initial prevailing activity of catalyst component (A) of the second catalyst system (i.e. an activity exceeding the activity of second catalyst component (B)) may achieve the object of the invention. Catalyst component (A) is relatively more active when compared to catalyst component (B) of the second catalyst system, for example, by introducing into the reactor an agent activating catalyst component (A) but substantially not acting on the activity of catalyst component (B), by introducing into the reactor an agent activating more catalyst component (A) than catalyst component (B), by introducing into the reactor an agent deactivating catalyst component (B), or by initially setting any polymerization conditions favoring an initial prevailing activity of catalyst component (A).

If the polymerization reactions are carried out in gas phase, the method preferably further comprises the step of adjusting the gas composition after carrying out step a2) and preferably before carrying out step b).

Preferably, the method further comprises the step of reducing the bed height after the first polymerization reaction.

In this way, it is advantageously possible either to minimize the amount of the deactivating agent or to further reduce the time for transitioning from the first to the second olefin polymerization reaction.

The present invention is illustrated below with the aid of examples, without being restricted thereto.

EXAMPLES

The examples illustrate a preferred embodiment of the invention referring to the preparation of a polymer in a continuous gas phase fluidized bed reactor. Here the transitioning from a Ziegler-Natta catalyst system to a mixed catalyst system comprising a non-metallocene late transition metal catalyst component and a metallocene component is described. More particularly, a first polymerization reaction of ethylene as monomer with butene as comonomer was carried out in a gas-phase fluidized-bed reactor having an output of 55 kg/h. Subsequently, in the same reactor a second polymerization reaction of ethylene as monomer with hexene as comonomer was carried out. The first polymerization reaction was carried out using the following first catalyst system and the second polymerization reaction was carried out using the following second catalyst system.

Example 1

First Catalyst System

As first catalyst system, A Ziegler-Natta catalyst system comprising Avant Z218-1, commercially available from Basell, as catalyst component and tri-isobutyl aluminum as activating agent (TIBAL, 10 wt % solution in hexane) was used.

Example 2

Second Catalyst System

As second catalyst system, a mixed catalyst system based on an iron-bisimine complex as non-metallocene component and on a hafnocene as metallocene component as described in the following was used.

As a pretreatment of the support, Sylopol 2326®, a spray-dried silica gel from Grace, was calcinated at 600° C. for 6 h.

2,6-Bis[1-(2-chloro-4,6-dimethylphenylimino)ethyl]pyridine was prepared as described in example 2 of WO 98/27124 and was used to synthesize 2,6-diacetylpyridinbis(2-dichloro-4,6-dimethylphenylanil) iron dichloride by using iron(II)chloride as described in example 8 of WO 98/27124.

Bis(n-butylcyclopentadienyl)hafnium dichloride [M=491.84 g/mol] was purchased from Crompton, Bergkamen.

A mixture of 6.77 g (11.98 mmol) of 2,6-diacetylpyridinbis (2-chloro-4,6-dimethylphenylanil) iron dichloride prepared as above, and 82.67 g (127.3 mmol) of bis(n-butylcyclopentadienyl)hafnium dichloride and 5.31 l MAO (4.75 M in toluene, 25.2 mol, commercially available from Albemarle) were stirred at ambient temperature for 60 min and subsequently, while stirring, added to 2400 g of the support pretreated as described in a) at 0° C. Additionally 5.5 l toluene was added via the feedline. The solution was further stirred at 20° C. for additional 2 hours (ratio (ΣFe+Hf):Al=1:140). After filtration a washing step followed by using 4.5 l heptane. Filtration was performed at 3 bar nitrogen pressure as maximum value. The product was predried for 30 minutes in a nitrogen stream. The main drying step was performed at 35° C. in vacuum by using nitrogen as carrier gas. The vacuum was kept at about 100 mbar under reduced stirring (5-10 U/min). The free flowing powder was finally sieved (sieve: 240 μm).

5.1 Kg catalyst was obtained

Example 3

First Polymerization Reaction Using the First Catalyst System

Feed streams of ethylene, hydrogen, propane and butene were introduced into the recycle gas line. The catalyst system of Example 1 was used.

The Ziegler-Natta catalyst component was introduced into the reactor via a precontacting vessel. Liquid propane and TIBAL were also fed continuously to the vessel. The flow rates of ethylene, hydrogen and butene were controlled to maintain gas composition target values. The concentrations of all gases were measured by an online gas cromatograph.

The feed rate of the catalyst was adjusted to maintain the production rate. A superficial gas velocity was kept at 0.45 m/s to keep the reactor in a fluidized state. The reactor was operated at a pressure of 25 bar and at a temperature of the reactor exit at 80° C. The bed mass was kept substantially constant by removing discontinuously product from the reactor. The product was discharged into a discharge vessel and the gases were recycled back to the reactor via the recycle gas line. The product was purged by nitrogen to remove the hydrocarbons and treated with humidified nitrogen to deactivate the catalyst residue.

In this way, a polymer with MFR(190° C./5 kg) of 2 and density of 0.945 g/cm$^3$ was produced.

The conditions set at steady state are shown in Table 1.

TABLE 1

| | | |
|---|---|---|
| $C_2H_4$ | 10 | mol % |
| $H_2$ | 6 | mol % |
| Propane | 83 | mol % |
| butene | 1 | mol % |
| TIBAL concentration | 363 | ppm |
| Antistatic | 18 | Ppm |

TABLE 1-continued

| | | |
|---|---|---|
| Bed weight | 140 | Kg |
| Reactor temperature | 80 | ° C. |
| Reactor pressure | 25 | Bar |
| Production rate | 55 | kg/h |
| Productivity | 5500 | g/g |
| MFR (190° C./5 kg) | 2 | g/10 min |
| Density | 0.945 | g/cm$^3$ |
| Bulk density | 440 | kg/m$^3$ |

Example 4

Transitioning from the First Polymerization Reaction to the Second Polymerization Reaction The first polymerization reaction carried out according to Example 3 was stopped by interrupting the feed of the first catalyst system, i.e. both of Avant Z218-1 and TIBAL, and by feeding, as an agent deactivating the first catalyst system, isopropanol. In order to reduce the amount of isopropanol to be used, before feeding the latter the bed level was dropped to a mass of 100 kg. Subsequently, 40 g of isopropanol was fed into the reactor in 2 hours time. Directly after starting the isopropanol feeding, the productivity decreased.

Subsequently, the reactor composition was adjusted to the target values shown in Table 2.

TABLE 2

| | | |
|---|---|---|
| Temperature | 100 | ° C. |
| Pressure | 25 | bar |
| Ethylene | 45 | mol % |
| Hydrogen | 0.06 | mol % |
| Hexene | 0.5 | mol % |

TIBAL feeding was started at 5 g/h, fed directly to the bed. After 2 hours, the mixed catalyst system of Example 2 was started to be fed at a rate of 8 g/h. The mixed catalyst system was fed also directly to the bed by using gaseous propane as carrier. The TIBAL feeding was reduced to 1 g/h. The feeding of the mixed catalyst was increased slowly with 2 g/h until a feeding rate of 16 g/h was reached. After 2 hours, the polymerization reaction could be detected. The production rate increased slowly. Samples were taken from the reactor every 3 hours. The melt index of the polymer increased rapidly up to value of MFR (190° C./2.16 kg) of 150 g/10 min, indicating that at this stage only the iron catalyst component was active. After about 6 hours of polymerization the melt index started to drop. Moreover, the hexene feeding to the plant to keep the target concentration increased steadily. This means that now the hafnium component of the mixed catalyst system was increasing its activity. Hydrogen and hexene concentrations were adjusted to achieve the product target. 36 hours after the start of the mixed catalyst feeding the product was on target. The conditions set at steady state are shown in Table 3.

TABLE 3

| | | |
|---|---|---|
| Temperature | 100 | ° C. |
| Pressure | 25 | bar |
| Ethylene | 45 | mol % |
| Hydrogen | 0.06 | mol % |
| Butene | 0.05 | mol % |
| Hexene | 0.30 | mol % |
| Bed weight | 140 | kg |
| Production rate | 48 | kg/h |
| Productivity | 3000 | g/g |
| TIBAL concentration | 21 | ppm |

TABLE 3-continued

| MFR (190° C./5 kg) | 8 g/10 min |
|---|---|
| Density | 0.952 |

In the present description and in the following claims, reference has been made to the following measuring methods.

Density is the polymer density in accordance with standard DIN EN ISO 1183-1:2004, method A (immersion).

The melt flow rate MFR (190/2.16) was determined according to DIN EN ISO 1133:2005, condition D at a temperature of 190° C. under a load of 2.16 kg.

The melt flow rate MFR (190/5) was determined according to DIN EN ISO 1133:2005, condition T at a temperature of 190° C. under a load of 5 kg.

The melt flow rate MFR (190/21.6) was determined according to DIN EN ISO 1133:2005, condition G at a temperature of 190° C. under a load of 21.6 kg.

$M_w$ is the weight average molar mass (weight average molecular weight) and $M_n$ is the number average molar mass (number average molecular weight). The determination of the molar mass $M_n$, $M_w$ was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series was used. The solvent was vacuum distilled under nitrogen and was stabilized with 0.025% by weight of 2,6-di-tert-butyl-4-methylphenol. The flow rate used was 1 ml/min, the injection was 500 μl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753 (1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraße 36, D-55437 Ober-Hilbersheim) respectively.

The invention claimed is:

1. A method for transitioning from a first to a second catalyst system for olefin polymerization in one reactor, the first catalyst system being incompatible with the second catalyst system, said method comprising the steps of:
    a) discontinuing a first olefin polymerization reaction performed in the presence of the first catalyst system; and
    b) performing a second olefin polymerization reaction in the presence of the second catalyst system comprising catalyst components (A) and (B) producing, respectively, a first and a second polyolefin fraction, wherein the $M_w$ of the first polyolefin fraction is less than the $M_w$ of the second polyolefin fraction and the initial activity of catalyst component (A) exceeds the initial activity of catalyst component (B).

2. The method according to claim 1, further comprising that step a) is carried out by the steps of:
    a1) interrupting a feeding of the first catalyst system into the reactor; and
    a2) deactivating the first catalyst system.

3. The method according to claim 2, wherein step a2) is carried out by feeding an agent deactivating the first catalyst system into the reactor.

4. The method according to claim 3, wherein the first catalyst system comprises a catalyst component and an agent activating the catalyst component.

5. The method according to claim 4 wherein the first catalyst system is a Ziegler-Natta catalyst system.

6. The method according to claim 5, wherein the agent activating the Ziegler-Natta catalyst comprises an organometallic compound of a metal of Group 1, 2 or 3.

7. The method according to claim 1 wherein catalyst component (A) of the second catalyst system comprises a late transition metal and catalyst component (B) of the second catalyst system is a metallocene.

8. The method according to claim 3 wherein said agent deactivating the first catalyst system is selected from the group consisting of oxygen, water, alcohols, glycols, phenols, carbon monoxide, carbon dioxide, ethers, carbonyl compounds, alkynes, and nitrous compounds.

9. The method according to claim 3 wherein said agent deactivating the first catalyst system is metered in excess, the method further comprising the step of neutralizing the excess of agent deactivating the first catalyst system by feeding a neutralizing agent into the reactor.

10. The method according to claim 4 wherein said agent deactivating the first catalyst system is metered in excess, the method further comprising the step of neutralizing the excess of agent deactivating the first catalyst system by feeding a neutralizing agent into the reactor, and the neutralizing agent is the same compound used as the agent activating the first catalyst system.

11. The method according to claim 9, wherein the second olefin polymerization reaction is initially performed in the presence of an agent reversibly deactivating catalyst component (B) of the second catalyst system.

12. The method according to claim 11, wherein the agent reversibly deactivating catalyst component (B) of the second catalyst system derives from the reaction between the agent deactivating the first catalyst system and the neutralizing agent.

13. The method according to claim 1 wherein the reactor is a continuous gas phase reactor.

* * * * *